(12) United States Patent
Cheng

(10) Patent No.: US 7,192,135 B1
(45) Date of Patent: Mar. 20, 2007

(54) EYEGLASSES ASSEMBLY

(76) Inventor: Yu-Chih Cheng, No. 10, Alley 16, Lane 40, Ta-Wan Rd., Yung-Kang City, Tainan Hsien (TW)

( * ) Notice: Subject to any disclaimer, the term of this patent is extended or adjusted under 35 U.S.C. 154(b) by 0 days.

(21) Appl. No.: 11/320,674

(22) Filed: Dec. 30, 2005

(51) Int. Cl.
*G02C 1/04* (2006.01)

(52) U.S. Cl. ........................................ 351/103; 351/106
(58) Field of Classification Search ................. 351/41, 351/44, 103–109, 154
See application file for complete search history.

(56) References Cited

U.S. PATENT DOCUMENTS 6,820,978 B1 * 11/2004 Tsai ............................. 351/103
7,090,346 B2 * 8/2006 Tsai ............................. 351/110

* cited by examiner

*Primary Examiner*—Huy K. Mai
(74) *Attorney, Agent, or Firm*—H.C. Park & Associates, PLC

(57) ABSTRACT

An eyeglasses assembly includes an engaging plate connected to a temple through a coupler. The engaging plate has an engaging hole, a front engaging surface bounding a front end of the engaging hole, and a rear engaging surface bounding a rear end of the engaging hole. The coupler has front and rear abutment faces for abutting against the front and rear engaging surfaces, respectively. The front abutment face is provided at a front end of the coupler, and the rear abutment faces is formed inwardly of an outer side of the coupler. In assembly, the front end of the coupler extends into the engaging hole and engages the front engaging surface, whereas an outer side of the coupler abuts against the rear abutment face.

6 Claims, 5 Drawing Sheets

EYEGLASSES ASSEMBLY

BACKGROUND OF THE INVENTION

1. Field of the Invention

The invention relates to an eyeglasses assembly, more particularly to an eyeglasses assembly that can be assembled easily.

2. Description of the Related Art

To meet various demands of users, there are many different designs of eyeglasses. Assembling designs for eyeglasses components also vary according to the functionality of the eyeglasses. At any rate, a less number of components and a simpler structure will incur less manufacturing costs and less assembly cost.

SUMMARY OF THE INVENTION

Therefore, the main object of the present invention is to provide an eyeglasses assembly which can be assembled easily and which has few components for assembly.

Accordingly, an eyeglasses assembly of this invention comprises an eyeglasses plate unit and a temple having a front end provided with a coupler.

An eyeglasses plate unit has an engaging plate connected to the coupler. The engaging plate includes inner and outer sides, a rear edge extending transversely of the inner and outer sides and proximate to the temple, an engaging hole which extends through the inner and outer sides proximate to the rear edge, a rear engaging surface bounding a rear end of the engaging hole proximate to the rear edge, and a front engaging surface bounding a front end of the engaging hole substantially opposite to the rear engaging surface. The front engaging surface extends transversely of the inner and outer sides. The rear engaging surface extends substantially in the same direction as and is formed inwardly of the outer side.

The coupler engages the engaging plate in front of the temple, and includes outer and inner sides, and a front abutment face extending transversely of the outer and inner sides of the coupler at a front end of the coupler opposite to the temple. The front abutment face abuts against the front engaging surface, and the outer side of the coupler abuts against the rear engaging surface.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
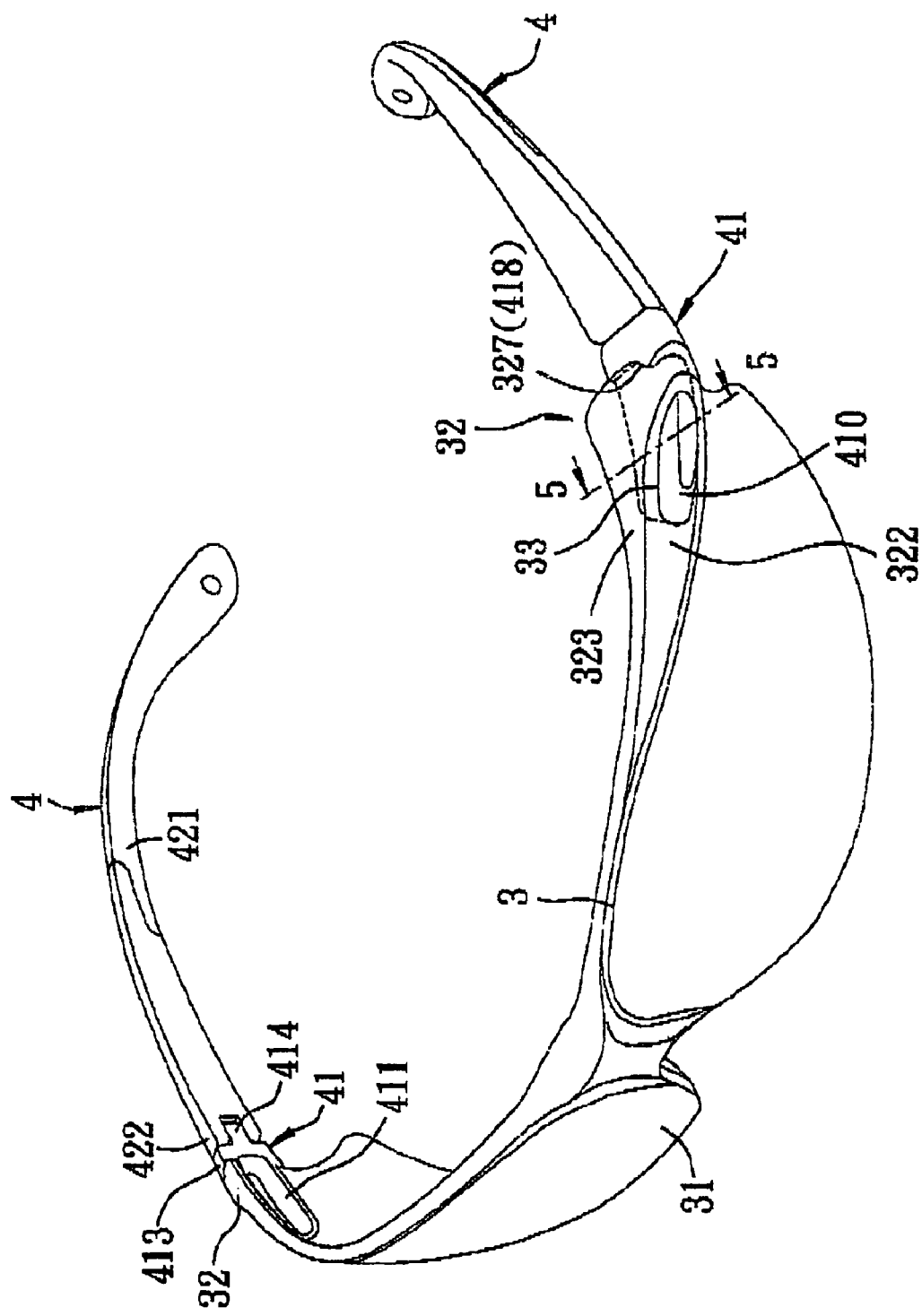
FIG. 1 is a perspective view of the preferred embodiment of an eyeglasses assembly according to the present invention.
Figure 2:
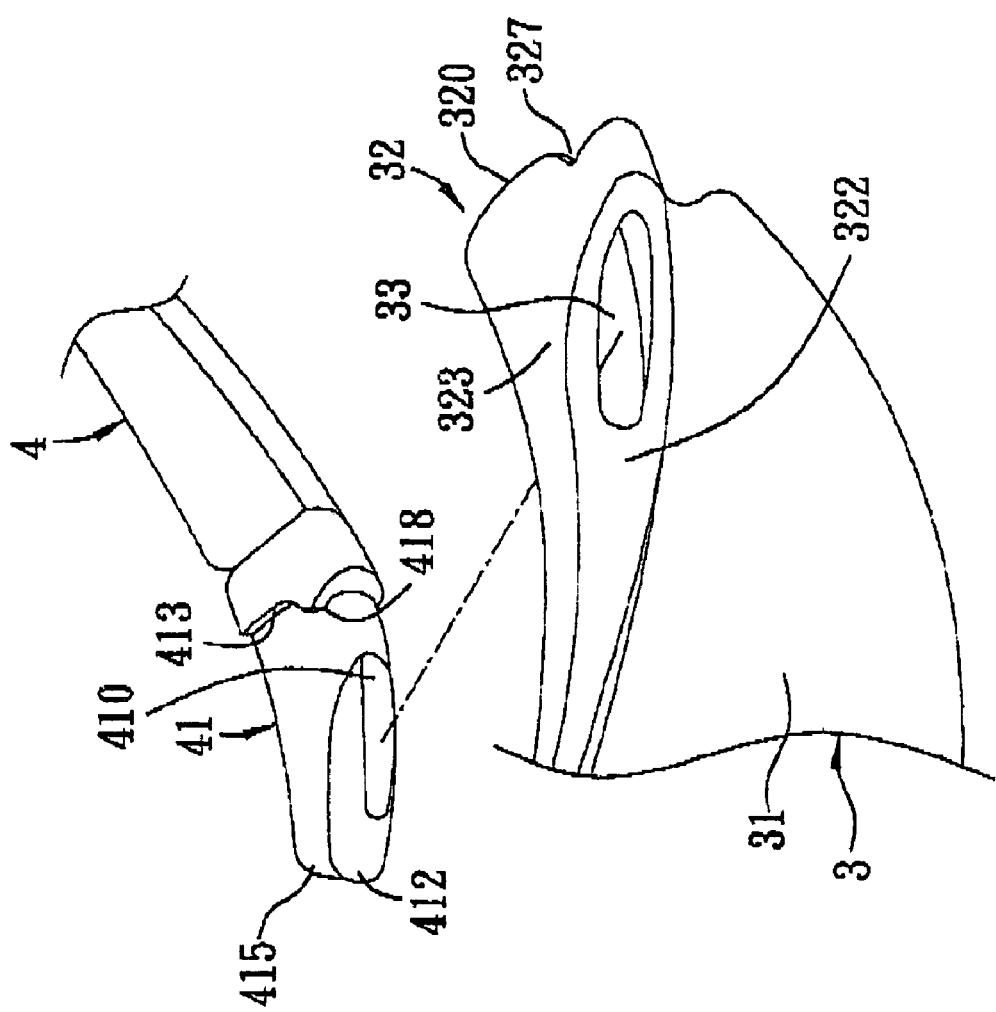
FIG. 2 is a fragmentary exploded perspective view of the preferred embodiment.
Figure 3:
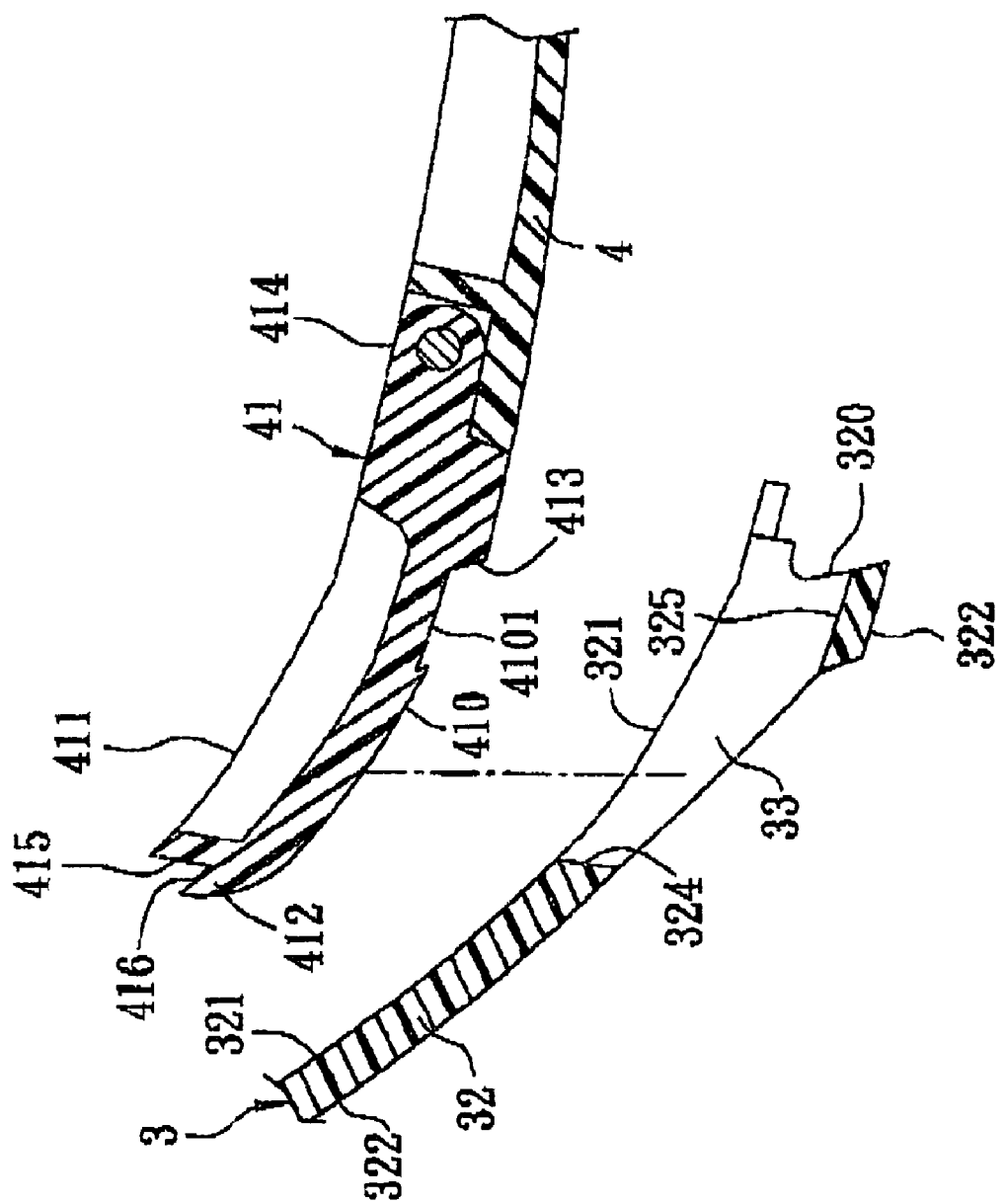
FIG. 3 is a top sectional view of the embodiment before assembly.

Referring to FIGS. 1, 2 and 3, the preferred embodiment of an eyeglasses assembly according to the present invention is shown to include an eyeglasses plate unit 3 and a pair of temples 4 which are coupled to the eyeglasses plate unit 3. Each temple 4 has a coupler 41 at a front end thereof.

The eyeglasses plate unit 3 includes a pair of lenses 31 and two engaging plates 32 connected respectively to the lenses 31. The lenses 31 and the engaging plates 32 are curved rearwardly at left and right ends of the eyeglasses plate unit 3. Each engaging plate 32 includes inner and outer sides 321, 322, a rear edge 320 extending transversely of the inner and outer sides 321, 322, and an engaging hole 33 penetrating the inner and outer sides 321, 322 proximate to the rear edge 320. Each engaging plate 32 further has a rear engaging surface 325 bounding a rear end of the engaging hole 33 proximate to the rear edge 320, and a front engaging surface 324 bounding a front end of the engaging hole 33 substantially opposite to the rear engaging surface 325. The front engaging surface 324 extends transversely of the inner and outer sides 321, 322. The rear engaging surface 325 extends substantially in the same direction as and is formed inwardly of the outer side 322.

Figure 4:
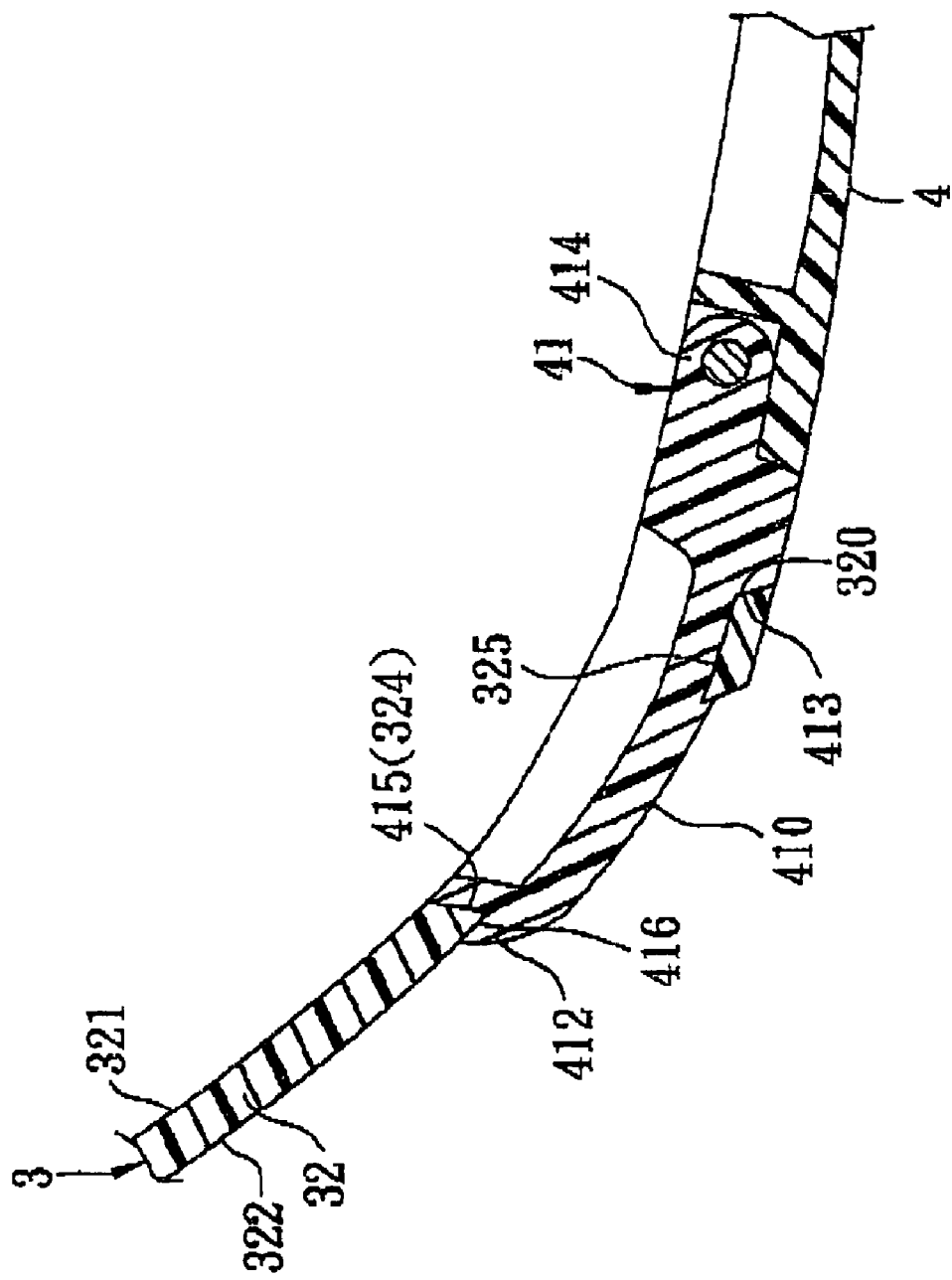
FIG. 4 is a top sectional view of the embodiment in an assembled state.

Each temple 4 has an earpiece 421 and a front pivot portion 422 pivotably connected to a rear end of the corresponding coupler 41. Referring to FIG. 4 in combination with FIGS. 2 and 3, each coupler 41 engages the engaging plate 32 in front of the temple 4 and includes outer and inner sides 410, 411, a pivot lug 414 pivotably connected to the front pivot portion 422 of the temple 4, and a front abutment face 415 extending transversely of the outer and inner sides 410, 411 of the coupler 41 at a front end of the coupler 41 opposite to the temple 4. The front abutment face 415 abuts against the front engaging surface 324, whereas the outer side 410 of the couple 41 abuts against the rear engaging surface 325.

The coupler 41 further includes a rib 412 projecting from the front abutment face 415 at the outer side 410 to provide a front shoulder face 416 which forms an angle with the front abutment face 415. The front shoulder face 416 abuts against the outer side 322 of the engaging plate 32. A rear shoulder face 413 is formed on the outer side 410 of the coupler 41 proximate to the rear engaging surface 325 of the engaging plate 32 for abutting against the rear edge 320 of the engaging plate 32. Furthermore, the outer side 410 of the coupler 41 has a recessed surface 4101 provided closely adjacent to the rear shoulder face 413.

For enhancement of engagement between the eyeglasses plate unit 3 and the coupler 41, the engaging plate 32 further has a notch 327 in the rear edge 320, and the rear shoulder face 413 of the coupler 41 has a protrusion 418 for engaging the notch 327.

Figure 5:
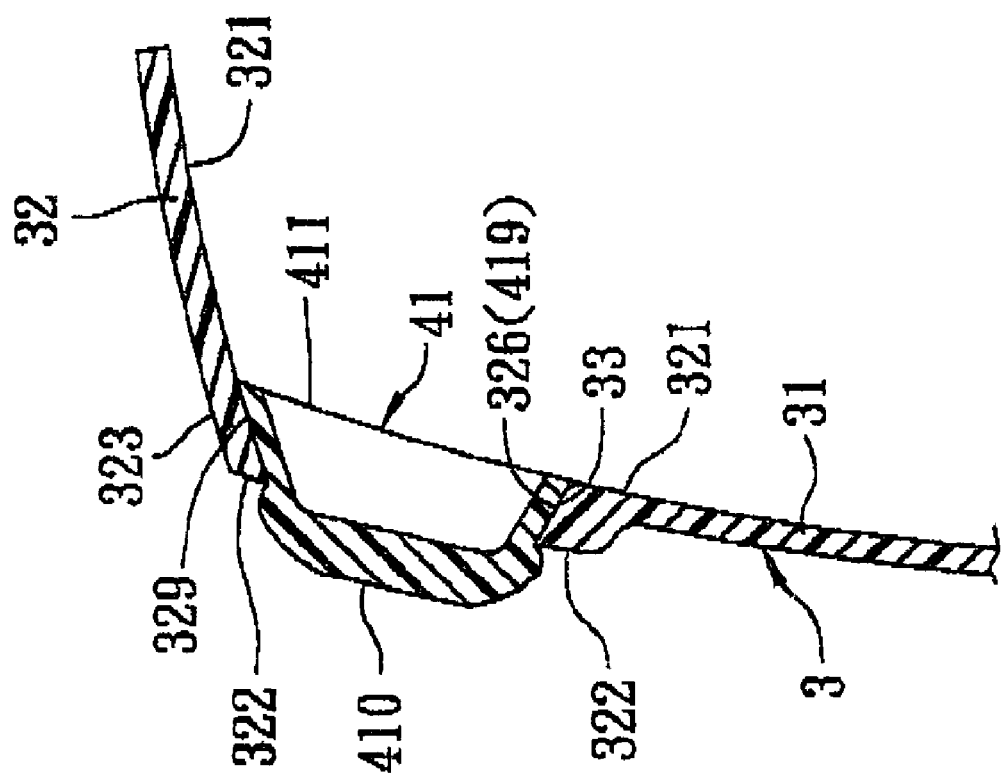
FIG. 5 is a side sectional view of the embodiment in an assembled state.

Referring to FIG. 5, each engaging plate 32 further includes a top flange 323 projecting inwardly from a top end of the engaging plate 32 and bounding a top end of the engaging hole 33, and a bottom engaging surface 326 bounding a bottom end of the engaging hole 33. The coupler 41 is provided with a top abutment surface 329 for abutting a bottom side of the top flange 323, and has a bottom abutment surface 419 for abutting the bottom engaging surface 326.

Referring again to FIGS. 1, 2, 3, 4 and 5, in assembly, the pivot lug 414 of the coupler 41 is pivotably coupled to the front pivot portion 422 of the temple 4. The front end of the coupler 41 is guided to extend through the engaging hole 33 of the engaging plate 32 until the front abutment face 415 reaches the front engaging surface 324. Then, the rear end of the coupler 41 is pushed toward the rear engaging surface 325 of the engaging hole 33 until the recessed surface 4101 of the coupler 41 abuts against the rear engaging surface 325. In this situation, the front abutment face 415 and the front shoulder face 416 of the coupler 41 abuts against the front engaging surface 324 and the outer side 322 of the engaging plate 32, respectively, the rear edge 320 of the engaging plate 32 abuts against the rear shoulder face 413, and the protrusion 418 formed on the rear shoulder face 413 engages the notch 327 of the rear edge 320 of the engaging plate 32. In addition, the top abutment surface 329 of the coupler 41 abuts the bottom side of the top flange 323, and the bottom abutment surface 419 of the coupler 41 abut the bottom engaging surface 326 of the engaging plate 32, as shown in FIG. 5. As the coupler 41 engages the engaging plate 32 and the engaging hole 33 at several points as mentioned above, a firm connection is provided between the coupler 41 and the engaging plate 32 according to the present invention.

While the engaging plates 32 are curved rearwardly in this embodiment, the engaging plates 32 may be in the form of a flat plate. Moreover, the coupler 41 and the temple 4 may be molded integrally such that there is no pivot connection between the temple 4 and the coupler 41.

When the temples 4 are to be disassembled from the eyeglasses unit 3, it is only necessary to push the couplers 41 inward to disengage the protrusions 418 from the respective notches 327 and to disengage the couplers 41 from the respective engaging holes 33.

In sum, the eyeglasses assembly of this invention is easy to assemble and disassemble, and is structurally robust after assembly.

While the present invention has been described in connection with what is considered the most practical and preferred embodiment, it is understood that this invention is not limited to the disclosed embodiment but is intended to cover various arrangement included within the spirit and scope of the broadest interpretation so as to encompass all such modifications and equivalent arrangements.

I claim:

1. An eyeglasses assembly, comprising:

a temple having a front end provided with a coupler; and an eyeglasses plate unit having an engaging plate connected to said coupler, said engaging plate including inner and outer sides, a rear edge extending transversely of said inner and outer sides, an engaging hole which extends through said inner and outer sides proximate to said rear edge, a rear engaging surface bounding a rear end of said engaging hole proximate to said rear edge, and a front engaging surface bounding a front end of said engaging hole substantially opposite to said rear engaging surface said front engaging surface extending transversely of said inner and outer sides said rear engaging surface extending substantially in the same direction as and being formed inwardly of said outer side;

said coupler engaging said engaging plate in front of said temple and including outer and inner sides, a front abutment face extending transversely of said outer and inner sides of said coupler at a front end of said coupler opposite to said temple; and said front abutment face abutting against said front engaging surface, said outer side of said coupler abutting against said rear engaging surface, wherein said coupler further includes a rib projecting from said front abutment face at said outer side and having a front shoulder face which forms an angle with said front abutment face, said front shoulder face abutting against said outer side of said engaging plate.

2. The eyeglasses assembly as claimed in claim 1, wherein said coupler further includes a rear shoulder face formed on said outer side of said coupler proximate to said rear engaging surface and abutting against said rear edge of said engaging plate.

3. The eyeglasses assembly as claimed in claim 2, wherein said outer side of said coupler has a recessed surface adjacent to said rear shoulder face, said recessed surface abutting with said rear engaging surface.

4. The eyeglasses assembly as claimed in claim 2, wherein said engaging plate further has a notch in said rear edge, said rear shoulder face having a protrusion engaging said notch.

5. The eyeglasses assembly as claimed in claim 4, wherein said engaging plate further includes a top flange projecting inwardly from a top end of said engaging plate and bounding a top end of said engaging hole, said coupler further having a top abutment surface abutting against a bottom side of said top flange.

6. The eyeglasses assembly as claimed in claim 5, wherein said engaging plate further includes a bottom engaging surface bounding a bottom end of said engaging hole, said coupler further having a bottom abutment surface abutting against said bottom engaging surface.

* * * * *